US012189869B1

(12) United States Patent
Liu et al.

(10) Patent No.: US 12,189,869 B1
(45) Date of Patent: Jan. 7, 2025

(54) MIXED REALITY PRODUCTION METHOD USING INERTIAL MEASUREMENT DATA AND ELECTRONIC DEVICE PERFORMING THE METHOD THEREOF

(71) Applicant: INSTITUTE FOR INFORMATION INDUSTRY, Taipei (TW)

(72) Inventors: Chi-Hsien Liu, Taipei (TW); Shang-Ming Wang, Taipei (TW); Chien-Hsin Lee, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 18/508,188

(22) Filed: Nov. 13, 2023

(30) Foreign Application Priority Data

Oct. 11, 2023 (TW) ................................ 112138827

(51) Int. Cl.
 *G06F 3/03* (2006.01)
 *G01C 21/16* (2006.01)
 (Continued)

(52) U.S. Cl.
 CPC ............... *G06F 3/03* (2013.01); *G01C 21/16* (2013.01); *G06T 7/73* (2017.01); *G06T 19/006* (2013.01)

(58) Field of Classification Search
 CPC ........................................................ G06F 3/03
 See application file for complete search history.

(56) References Cited

U.S. PATENT DOCUMENTS

2019/0385371 A1\* 12/2019 Joyce ................. G02B 27/0172
2020/0090407 A1   3/2020 Miranda et al.
(Continued)

FOREIGN PATENT DOCUMENTS

| CN | 111902794 A | 11/2020 |
| CN | 115552356 A | 12/2022 |
| WO | 2022/189832 A1 | 9/2022 |

OTHER PUBLICATIONS

The office action of the corresponding Taiwanese application No. TW112138827 issued on Apr. 26, 2024.
(Continued)

*Primary Examiner* — Gustavo Polo
(74) *Attorney, Agent, or Firm* — CKC & Partners Co., LLC

(57) ABSTRACT

An electronic device is disclosed. The electronic device includes an inertial measurement element and a processor. The inertial measurement element is configured to obtain a first inertial measurement data when the electronic device moves. The processor is configured to perform the following operations: establishing a mixed reality environment coordinate system in correspondence according to the real space, and calculating a starting coordinate point of the electronic device in the mixed reality environment coordinate system; converting the first inertial measurement data into a first movement vector in the mixed reality environment coordinate system according to an inertial measurement data mapping model; calculating a first spatial operation point in the mixed reality environment coordinate system according to the starting coordinate point and the first movement vector in the mixed reality environment coordinate system; and executing a 3D scene editing program with the first spatial operation point.

18 Claims, 5 Drawing Sheets

(51) Int. Cl.
 *G06T 7/73* (2017.01)
 *G06T 19/00* (2011.01)

(56) References Cited

U.S. PATENT DOCUMENTS

2020/0192486 A1\* 6/2020 Schoessler ............ G06F 3/0346
2020/0368616 A1 11/2020 Delamont
2022/0366597 A1 11/2022 Nandipati et al.
2023/0098910 A1\* 3/2023 Ma ...................... G02B 27/017
 345/8

OTHER PUBLICATIONS

The office action of the corresponding British application No. GB2317995.5 issued on May 31, 2024.

\* cited by examiner

MIXED REALITY PRODUCTION METHOD USING INERTIAL MEASUREMENT DATA AND ELECTRONIC DEVICE PERFORMING THE METHOD THEREOF

CROSS-REFERENCE TO RELATED APPLICATION

This application claims the priority benefit of TAIWAN Application serial no. 112138827, filed Oct. 11, 2023, the full disclosure of which is incorporated herein by reference.

BACKGROUND

Field of Invention

The invention relates to an electronic device and a mixed reality production method. More particularly, the invention relates to an electronic device and a mixed reality production method for positioning through an inertial measurement data mapping model.

Description of Related Art

The establishment of the mixed reality environment coordinate system of mixed reality (MR) currently often requires the assistance of a large number of spatial anchor points and the assistance of real-time image recognition algorithms, which not only consumes a large amount of calculations, but also unable to perform virtual content import operations instantly.

Therefore, how to provide a mixed reality production method and a device thereof that requires low computing power and can instantly import virtual content in real space is one of the problems to be solved in the field.

SUMMARY

Therefore, the present invention provides an electronic device and mixed reality production method that solve the above problems.

An aspect of this disclosure is to provide an electronic device. The electronic device can be moved within a real space. The electronic device includes an inertial measurement element and a processor. The inertial measurement element is configured to obtain a first inertial measurement data when the electronic device moves. The processor is electrically coupled to the inertial measurement element. The processor is configured to perform the following operations: establishing a mixed reality environment coordinate system in correspondence according to the real space, and calculating a starting coordinate point of the electronic device in the mixed reality environment coordinate system; converting the first inertial measurement data into a first movement vector in the mixed reality environment coordinate system according to an inertial measurement data mapping model; calculating a first spatial operation point in the mixed reality environment coordinate system according to the starting coordinate point and the first movement vector in the mixed reality environment coordinate system; and executing a 3D scene editing program with the first spatial operation point.

Another aspect of this disclosure is to provide a mixed reality production method. The mixed reality production method is suitable for an electronic device. The mixed reality production method includes the following operations: establishing a mixed reality environment coordinate system in correspondence according to a feature anchor of a real space, and calculating a starting coordinate point of the electronic device in the mixed reality environment coordinate system; obtaining a first inertial measurement data when the electronic device moves; converting the first inertial measurement data into a first movement vector in the mixed reality environment coordinate system according to an inertial measurement data mapping model; calculating a first spatial operation point in the mixed reality environment coordinate system according to the starting coordinate point and the first movement vector in the mixed reality environment coordinate system; and executing a 3D scene editing program with the first spatial operation point.

According to the above, the embodiments of the present disclosure provide an electronic device and a mixed reality production method Compared with the traditional mixed reality production method, there is no need to establish a large number of recognition space anchor points, and there is no need to perform labor-intensive calculations of real-time matching and positioning (such as SLAM or feature point identification). The embodiments of the present disclosure only needs to identify a single starting anchor point (such as the feature anchor ANC in FIG. 1), and the starting coordinate point and the spatial operation point are calculated with the inertial measurement data mapping model and the inertial measurement data. Compared with the traditional mixed reality production method, the embodiments of the present disclosure can significantly reduce the amount of calculations. In addition, the embodiments of the present invention can edit mixed reality events, special effects actions and virtual object rendering programs in real time while the electronic device is moving, and the embodiments of the present disclosure can conduct real-time preview on the electronic device, making it more intuitive and more convenient when performing mixed reality production.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
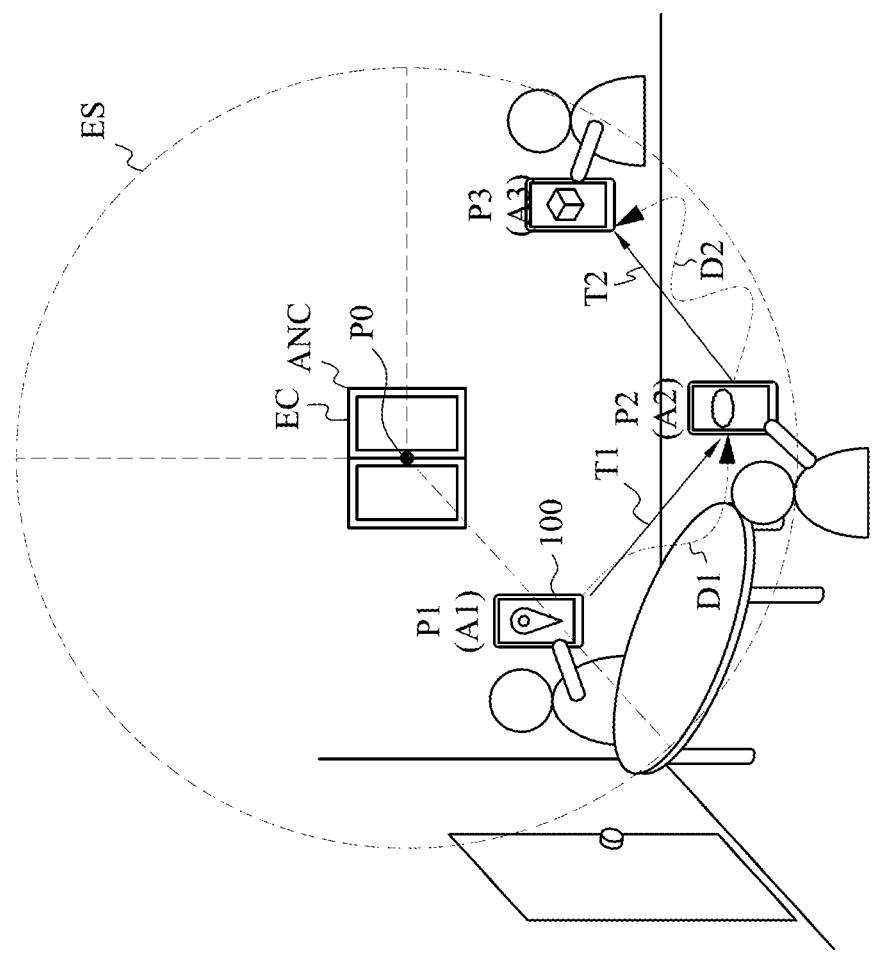
FIG. 1 is a schematic diagram illustrating an electronic device and the real space in which the electronic device operates according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1. FIG. 1 is a schematic diagram illustrating an electronic device 100 and the real space E in which the electronic device operates according to some embodiments of the present disclosure. As illustrated in FIG. 1, the electronic device 100 can move in a real space E. According to the real space E, the electronic device 100 establishes a mixed reality environment coordinate system ES corresponding to the real space E. According to positions of the electronic device 100 in the real space E, a starting coordinate point P1 and spatial operation points P2, P3 in the mixed reality environment coordinate system ES in correspondence are calculated. Also, according to the starting coordinate point P1 and the spatial operation points P2, P3, a 3D scene editing program is executed.

Regarding the details of the establishment of the starting coordinate point P1 and the spatial operation points P2 and P3, and the details of the execution of the 3D scene editing program will be explained below with reference to FIG. 2 to FIG. 3.

Figure 2:
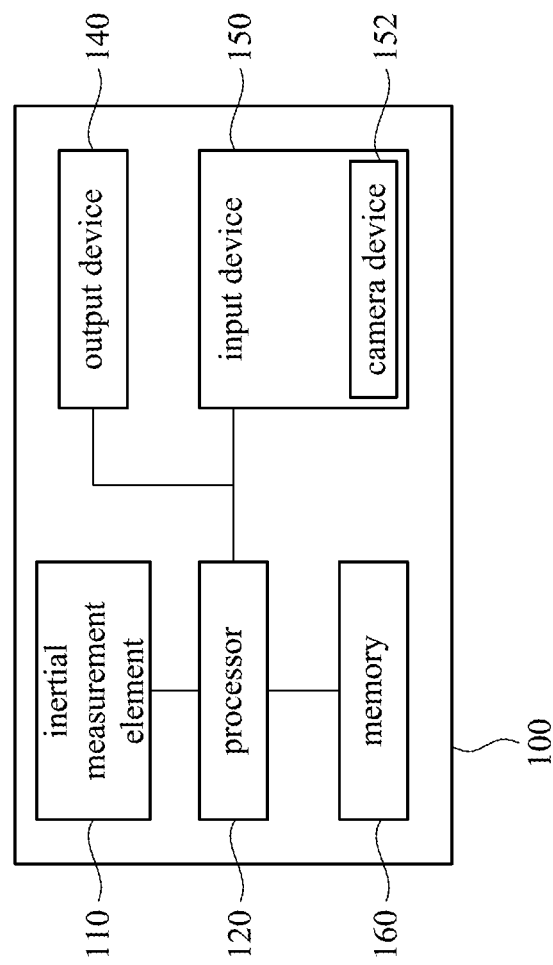
FIG. 2 is a schematic diagram illustrating an electronic device according to some embodiments of the present disclosure.

Reference is made to FIG. 2. In some embodiments, the electronic device 100 includes an inertial measurement element 110, a processor 120, an output device 140, an input device 150 and a memory 160. In some embodiments, the input device 150 includes a camera device 152.

In the connection relationship, the inertial measurement element 110, the output device 140, the input device 150 and the memory 160 couples to the processor 120 respectively. The detailed operation method of the electronic device 100 in FIG. 2 will be explained with reference to FIG. 3 below.

Figure 3:
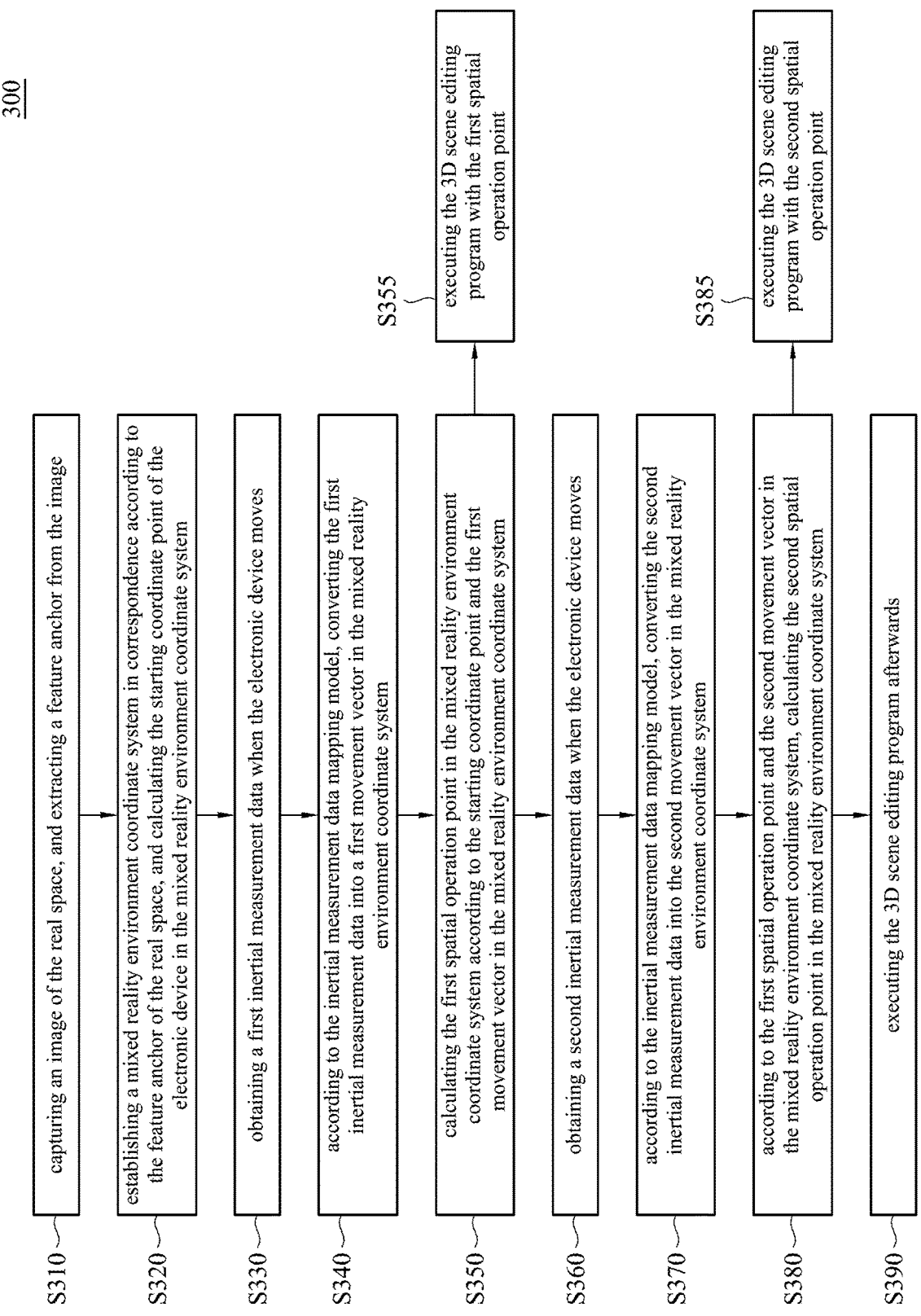
FIG. 3 is a flow chart illustrating a mixed reality production method according to some embodiments of the present disclosure.

Reference is made to FIG. 3. FIG. 3 is a flow chart illustrating a mixed reality production method 300 according to some embodiments of the present disclosure.

The mixed reality production method 300 can be applied to system with the same or similar structure as the electronic device 100 is FIG. 1 and FIG. 2. To make the description simple, the following will take FIG. 2 as an example to describe the operation method, but the embodiments of the present disclosure are not limited to the application of FIG. 2.

It should be noted that, in some embodiments, the mixed reality production method 300 can also be implemented as a computer program and stored in a memory 160 as illustrated in FIG. 2, so that the computer, the electronic device, or the processor 120 of the electronic device 100 in FIG. 2 can perform this operation method after reading this recording media. The processor 120 may include one or more chips. The memory 160 can be read-only memory, flash memory, floppy disks, hard disks, optical disks, flash drives, tapes, databases that can be accessed over the Internet, or a non-transitory computer with the same function can read the recording medium those who are familiar with this technology can easily think of.

In addition, it should be noted that the operations of the mixed reality production method 300 mentioned in this embodiment can be adjusted according to actual needs, and can even be performed at the same time or partly, unless the order is specifically stated.

Furthermore, in different embodiments, these operations may also be adaptively added, replaced, and/or omitted.

Reference is made to FIG. 3. The mixed reality production method 300 includes the following operations S310 to S390. The following will refer to FIG. 1 and FIG. 2 together for explanation.

In operation S310, an image of the real space is captured, and a feature anchor is extracted from the image. In some embodiments, the camera device 152 as illustrated in FIG. 2 captures an image of the real space E from the position A1 of the real space E in FIG. 1. The image captured by the camera device 152 includes the environmental feature EC in FIG. 1. Then, the processor 120 extracts the feature anchor ACH according to the environmental feature EC.

In operation S320, a mixed reality environment coordinate system in correspondence is established according to the feature anchor of the real space, and the starting coordinate point of the electronic device in the mixed reality environment coordinate system is calculated. In some embodiments, the processor 120 as illustrated in FIG. 2 establishes the mixed reality environment coordinate system ES in correspondence according to the feature anchor ACH. In some embodiments, the mixed reality environment coordinate system ES takes the center of the feature anchor ACH as the coordinate system origin P0, and the mixed reality environment coordinate system ES is established based on the coordinate system origin.

According to the coordinate system origin P0, the processor 120 calculates the starting coordinate point P1 of the electronic device 100 in the mixed reality environment coordinate system. In an embodiment, the processor 120 calculates the starting coordinate point P1 with a simultaneous positioning and mapping (SLAM) method. However, the embodiments of the present disclosure are not limited thereto.

In operation S330, a first inertial measurement data is obtained when the electronic device moves. In some embodiments, when the electronic device 100 moves in the real space E as shown in FIG. 1, the inertial measurement element 110 as shown in FIG. 2 obtains the inertial measurement data when the electronic device 100 moves. For example, when the electronic device 100 moves from position A1 in the real space E to position A2 in the real space E as shown in FIG. 1, the inertial measurement element 110 obtains the inertial measurement data D1 of the electronic device 100 moving from the position A1 in the real space E to the position A2 in the real space E.

In operation S340, according to the inertial measurement data mapping model, the first inertial measurement data is converted into a first movement vector in the mixed reality environment coordinate system. In some embodiments, the inertial measurement data mapping model is stored in the memory 160 as shown in FIG. 2 for the processor 120 to access.

In some embodiments, the inertial measurement data mapping model is trained by a training device according to different training electronic devices.

The inertial measurement data mapping model will be explained below with reference to FIG. 5.

Figure 5:
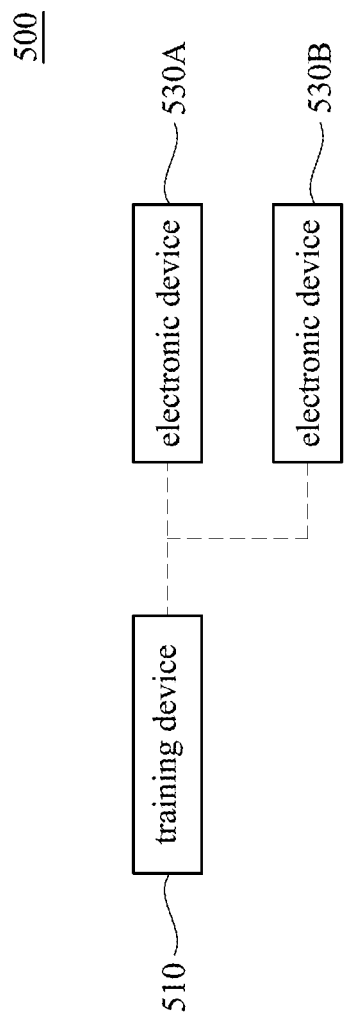
FIG. 5 is a schematic diagram illustrating a mixed reality production system according to some embodiments of the present disclosure.

In some embodiments, the processor 120 of the electronic device 100 loads the inertial measurement data mapping model from the training device 510 in FIG. 5.

In some embodiments, when the electronic device 100 moves from position A1 in the real space E to position A2 in the real space E, the inertial measurement data mapping model converts the inertial measurement data D1 into the movement vector T1 in the mixed reality environment coordinate system ES.

In some embodiments, the processor 120 of the electronic device 100 first performs a normalization process on the inertial measurement data D1 to map it to a unified value range, and then inputs the normalized inertial measurement data D1 after the normalization process into the inertial measurement data mapping model to obtain the movement vector T1. In some embodiments, the unified value range is the value range preset during training of the inertial measurement data mapping model.

In some embodiments, the movement vector T1 includes a movement distance and a rotation angle. The movement vector T1 includes the six degrees of freedom (6DoF) movement trajectory of the spatial operation point P2 relative to the starting coordinate point P1.

In operation S350, the first spatial operation point in the mixed reality environment coordinate system is calculated according to the starting coordinate point and the first movement vector in the mixed reality environment coordinate system. For example, In some embodiments, The processor 120 adds the starting coordinate point P1 and the movement vector T1 to obtain the spatial operation point P2 in the mixed reality environment coordinate system ES.

In some embodiments, the processor 120 system calculates the spatial operation point P2 according to the following calculation formula (1).

$$P2=P1+T1. \qquad \text{Calculation formula (1):}$$

P1 and P2 in the above calculation formula (1) are spatial operation points, and T1 is a movement vector.

In operation S355, the 3D scene editing program is executed with the first spatial operation point. In some embodiments, the 3D scene editing program includes one of the event program, the special effects action program and the virtual object rendering program.

In some embodiments, operation S355 is executed instantly when the electronic device 100 moves to position A2 and the processor 120 calculates the spatial operation point P2.

In some embodiments, the event program, the special effects action program and the virtual object rendering program included in the 3D scene editing program includes several event programs, several special effects action programs, and several virtual object rendering programs.

In some embodiments, after the processor 120 executes the 3D scene editing program at position A2 in real space, it stores the 3D scene editing program corresponding to the spatial operation point P2.

Figure 4:
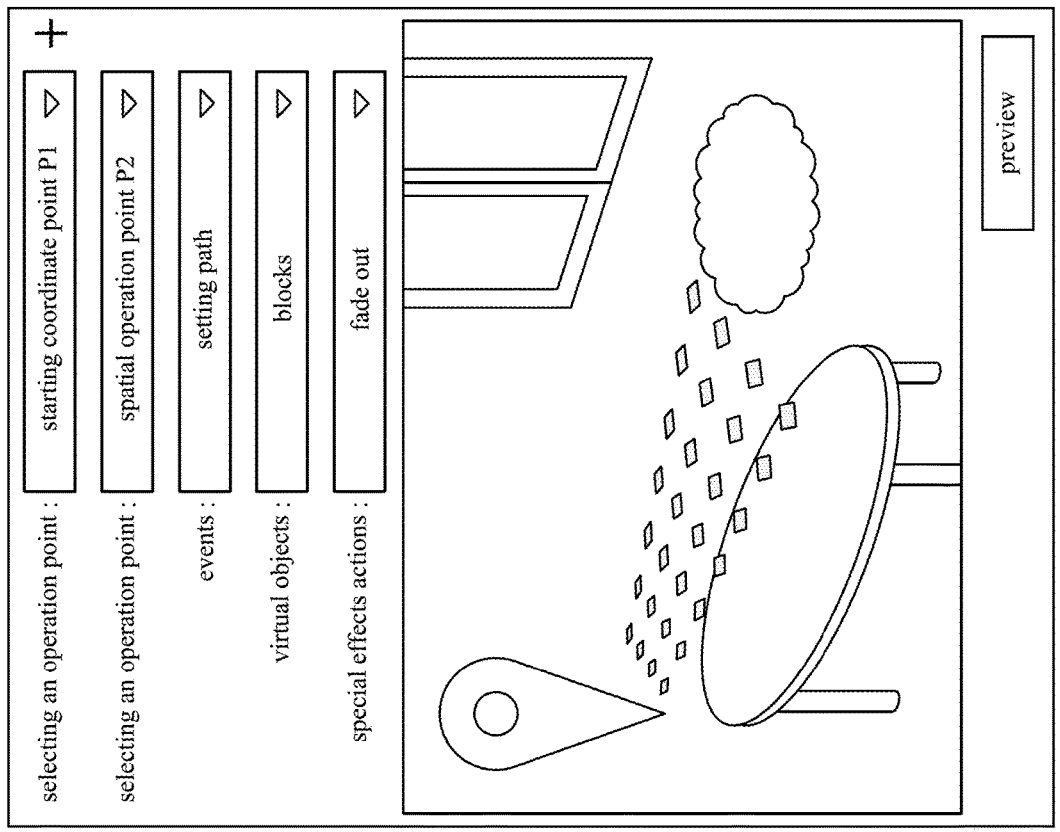
FIG. 4 is a schematic diagram illustrating an edit list according to some embodiments of the present disclosure.

In some embodiments, when the processor 120 executes the 3D scene editing program, the screen device of the output device 140 of the electronic device 100 displays the edit list. The contents of the edit list are selected from one of several event programs, special effects action programs and virtual object rendering programs. Reference is made to FIG. 4 together. FIG. 4 is a schematic diagram illustrating an edit list 400 according to some embodiments of the present disclosure. As shown in FIG. 4, the edit list 400 includes a selection list of operation points, events, virtual objects, special effects actions, etc. The user can select the three-dimensional scene to be edited through the above selection list, and the processor 120 executes one part of the event program, special effects action program and virtual object rendering program in the 3D scene editing program according to the contents of the edit list 400.

In some embodiments, after the processor 120 executes the 3D scene editing program, the input device 150 receives and sends the selection signal to the processor 120. The processor 120 sequentially executes the selection signal to execute the operation points, events, virtual objects, special effects actions, etc. selected in the edit list 400 to execute the 3D scene editing program.

In some embodiments, when the processor 120 is executing the 3D scene editing program, the output device 140 of the electronic device 100 outputs one of the event program, the special effects action program and the virtual object rendering program in the 3D scene editing program. For example, reference is made to FIG. 4 together. The screen device of the output device 140 of the electronic device 100 is also configured to display the preview screen in real time when the 3D scene editing program is executed.

Reference is made to FIG. 1 and FIG. 2 together. In some embodiments, after the processor 120 executes the 3D scene editing program based on the spatial operation point P2, when processor 120 stores the 3D scene editing program, it also stores the starting coordinate point P1 and the spatial operation point P2 in the memory 160.

In operation S360, a second inertial measurement data is obtained when the electronic device moves.

Reference is made to FIG. 1 together. In some embodiments, the electronic device 100 moves from position A2 to position A3 in real space E. When the electronic device 100 moves from position A2 in real space E to position A3 in real space E, the inertial measurement element 110 obtains the inertial measurement data D2 of the electronic device 100 moving from position A2 in real space E to position A3 in real space E.

In operation S370, according to the inertial measurement data mapping model, the second inertial measurement data is converted into the second movement vector in the mixed reality environment coordinate system. After the inertial measurement element 110 obtains the inertial measurement data D2, the inertial measurement data mapping model converts the inertial measurement data D2 into the movement vector T2 in the mixed reality environment coordinate system ES.

In some embodiments, the processor 120 of the electronic device 100 first performs a normalization process to the inertial measurement data D2, so as to map the inertial measurement data D2 to a unified value range, and then the processor 120 inputs the normalized inertial measurement data D2 after the normalization process into the inertial measurement data mapping model to obtain the movement vector T2. In some embodiments, the unified value range is the value range preset during the training of the inertial measurement data mapping model.

In some embodiments, the movement vector T2 includes a movement distance and a rotation angle. The movement vector T2 includes a six degrees of freedom (6DoF) movement trajectory of spatial the operation point P3 relative to the spatial operation point P2.

In operation S380, according to the first spatial operation point and the second movement vector in the mixed reality environment coordinate system, the second spatial operation point in the mixed reality environment coordinate system is calculated.

In some embodiments, the processor 120 adds the spatial operation point P2 and the movement vector T2 to obtain the second spatial operation point P3 in the mixed reality environment coordinate system ES.

In some embodiments, the processor 120 series calculates the spatial operation point P3 according to the following calculation formula (2). The calculation formula (2): P3=P2+T2.

P2 and P3 in the above calculation formula (2) are spatial operation points, and T2 is the movement vector.

In operation S385, the 3D scene editing program is executed with the second spatial operation point. In some embodiments, the operation S385 is executed instantly when the electronic device 100 is moved to the position A3 and instantly when the processor 120 calculates the spatial operation point P3.

In some embodiments, after the processor 120 executes the 3D scene editing program based on the spatial operation point P3, the processor 120 stores the 3D scene editing program corresponding to the spatial operation point P3.

In some embodiments, after the processor 120 executes the 3D scene editing program based on the spatial operation point P3, the processor 120 stores the spatial operation point P2 and the spatial operation point P3 in the memory 160 when storing the 3D scene editing program.

The detailed operation method of operation S385 is similar to that of operation S355 and will not be described in detail here.

In operation S390, the 3D scene editing program is executed afterwards.

In some embodiments, the processor 120 of the electronic device 100 can first store the starting coordinate point P1, the spatial operation points P2 to P3, and then select the operation points, events, virtual objects, special effects actions, etc. through the edit list 400 as shown in FIG. 4, and the processor 120 executes the 3D scene editing program afterwards.

It should be noted that, in the implementation of the present invention, more spatial operation points and their corresponding 3D scene editing programs can be created and stored. In addition, the starting coordinate point P1, the spatial operation points P2 to P3 as mentioned above include the coordinates of the starting coordinate point P1, the spatial operation points P2 to P3 in the mixed reality environment coordinate system ES respectively.

Reference is made to FIG. 5. FIG. 5 is a schematic diagram illustrating a mixed reality production system 500 according to some embodiments of the present disclosure. The mixed reality production system 500 includes the training device 510, the electronic devices 530A and 530B.

In some embodiments, the electronic devices 530A and 530B are different testing electronic devices. The training device 510 includes an inertial measurement data mapping model. The training device 510 is configured to collect the testing inertial measurement data after the electronic devices 530A and 530B move along the same testing route (for example, from position A to position B in FIG. 1). The testing inertial measurement data of the electronic device 530A and the testing inertial measurement data of the electronic device 530B are respectively generated by different inertial measurement elements of the electronic devices 530A and 530B. The testing inertial measurement data of the electronic device 530A and the testing inertial measurement data of the electronic device 530B have different data ranges. The training device 510 trains the inertial measurement data mapping model according to the testing inertial measurement data of electronic devices 530A and 530B, so that the inertial measurement data mapping model maps the testing inertial measurement data of the electronic device 530A and the testing inertial measurement data of the electronic device 530B to testing movement vectors of the same value.

That is to say, when the inertial measurement data DA generated by electronic device 530A moving from position A to position B in FIG. 1 or the inertial measurement data DB generated by electronic device 530B moving from position A to position B in FIG. 1 are input to the inertial measurement data mapping model, the movement vector generated is T1.

In some embodiments, the inertial measurement data mapping model is trained using long short-term memory (LSTM). However, the embodiments of the present disclosure are not limited thereto.

In some embodiments, the training device 510 is further configured to map the different inertial measurement data generated by the different inertial measurement elements of the testing electronic devices 530A and 530B of different specifications to the same output value range through the inertial measurement data mapping model, so as to generate a corrected inertial measurement data, and then the training device 510 inputs the corrected inertial measurement data into the inertial measurement data mapping model to train the inertial measurement data mapping model.

For example, in one embodiment, the training device 510 first preprocesses the different inertial measurement data generated by the different inertial measurement elements of the different testing electronic devices 530A and 530B using normalization process, so that the different inertial measurement data generated by different inertial measurement elements are converted to the same data interval. For example, the inertial measurement data after normalization process lies within the value between 1 and −1. After the normalization process, the inertial measurement data mapping model is trained with the normalized inertial measurement data.

In this way, the movement vectors generated by the different inertial measurement data generated by the different inertial measurement elements of the different testing electronic devices 530A and 530B are unified through the inertial measurement data mapping model, which can reduce the calculation error of spatial operation point caused by the different inertial measurement elements of different testing electronic devices 530A and 530B.

In the above embodiments, only testing electronic devices 530A and 530B are used as examples, and more testing electronic devices are also within the embodiments of the present disclosure.

Figure 6:
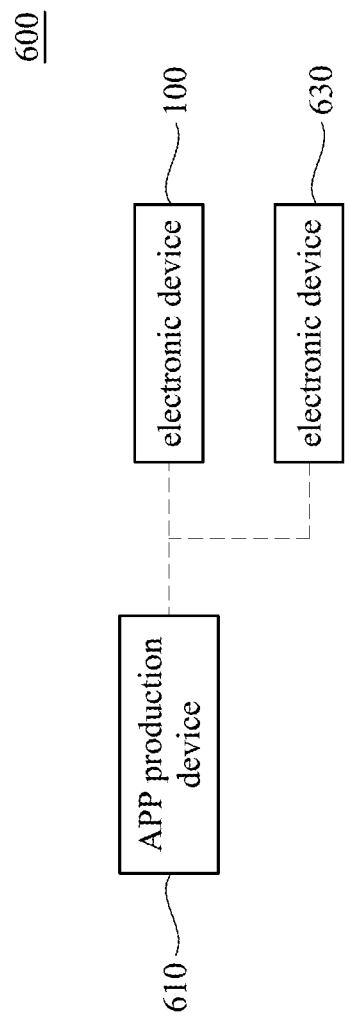
FIG. 6 is a schematic diagram illustrating a mixed reality production system according to some embodiments of the present disclosure.

Reference is made to FIG. 6. FIG. 6 is a schematic diagram illustrating a mixed reality production system 600 according to some embodiments of the present disclosure.

The mixed reality production system 600 further includes an APP production device 610 and electronic devices 100, 630. The electronic device 100 transmits the starting coordinate point P1, spatial operation points P2, P3 and the edited 3D scene editing program generated by the mixed reality production method 300 to the APP production device 610. The APP production device 610 generates an application program APP according to the starting coordinate point P1, spatial operation points P2, P3 and the edited 3D scene editing program transmitted by the electronic device 100. In some embodiments, the electronic device 100 transmits the inertial measurement data mapping model to the APP production device 610.

In some embodiments, the electronic device 630 can download the application program APP and the inertial measurement data mapping model from the APP production device 610. The electronic device 630 first obtains the feature anchor ACH from the position A1 in the real space E in FIG. 1 according to the environmental features EC and establishes mixed reality environment coordinate system ES, and the electronic device 630 calculates the starting coordinate point P1 of the electronic device 630. When the electronic device 630 moves from position A1 to position A2, after the inertial measurement element of the electronic device 630 obtains the inertial measurement data, the processor of the electronic device 630 inputs the inertial measurement data into the inertial measurement data mapping model to obtain the corresponding movement vector. T1. Then the processor of the electronic device 630 adds the starting coordinate point P1 and the movement vector T1 to obtain the spatial operation point P2 corresponding to the position A2. When the processor of the electronic device 630 determines that the electronic device 630 moves to position A2 and the corresponding spatial operation point P2, the processor of the electronic device 630 executes parts of the events, special effects actions and virtual object rendering corresponding to the spatial operation point P2. The abovementioned events, special effects actions and virtual object rendering corresponding to the spatial operation point P2 are created by the electronic device 100.

In some embodiments, the training device 510 and the APP production device 610 may be servers or other electronic devices. In some embodiments, the training device 510 and the APP production device 610 include processor, memory, input device, output device, etc.

In some embodiments, the electronic device 100, 530A, 530B, and 630 may be a server, a circuit, a central processing unit (CPU), microprocessor (MCU) with functions such as storage, calculation, data reading, receiving signals or messages, transmitting signals or messages, etc.), microprocessor (MCU) or other devices other with equivalent functions.

In some embodiments, the inertial measurement element 110 may be an element with inertial measurement data obtaining or with similar functions, such as a micro electro mechanical system (MEMS), an inertial sensor (inertial measurement unit, IMU), etc. In some embodiments, the camera device 152 may be an element with image capture or other similar functions. In some embodiments, the output device 140 may be an element with signal output or similar functions, such as a screen, a projection device, a speaker, a vibrator, etc., and the input device 150 may be an element with signal input or similar functions, such as a touch device, lens, microphones, sensors, etc.

According to the embodiment of the present disclosure, it is understood that the embodiments of the present disclosure is to provide an electronic device and a mixed reality production method. Compared with the traditional mixed reality production method, there is no need to establish a large number of recognition space anchor points, and there is no need to perform labor-intensive calculations of real-time matching and positioning (such as SLAM or feature point identification). The embodiments of the present disclosure only needs to identify a single starting anchor point (such as the feature anchor ANC in FIG. 1), and the starting coordinate point and the spatial operation point are calculated with the inertial measurement data mapping model and the inertial measurement data. Compared with the traditional mixed reality production method, the embodiments of the present disclosure can significantly reduce the amount of calculations. In addition, the embodiments of the present invention can edit mixed reality events, special effects actions and virtual object rendering programs in real time while the electronic device is moving, and the embodiments of the present disclosure can conduct real-time preview on the electronic device, making it more intuitive and more convenient when performing mixed reality production.

In addition, the above illustrations include sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, the electronic device can be moved within a real space, the electronic device comprising:
   an inertial measurement element, configured to obtain a first inertial measurement data when the electronic device moves; and
   a processor, electrically coupled to the inertial measurement element, configured to perform the following operations:
      establishing a mixed reality environment coordinate system in correspondence according to the real space, and calculating a starting coordinate point of the electronic device in the mixed reality environment coordinate system;
      converting the first inertial measurement data into a first movement vector in the mixed reality environment coordinate system according to an inertial measurement data mapping model;
      calculating a first spatial operation point in the mixed reality environment coordinate system according to the starting coordinate point and the first movement vector in the mixed reality environment coordinate system; and
      executing a 3D scene editing program with the first spatial operation point, wherein a training of the inertial measurement data mapping model comprises:
         collecting a plurality of testing inertial measurement data of a plurality of different testing electronic devices moving along a same testing route respectively, wherein the plurality of testing inertial measurement data are generated by a plurality of different inertial measurement elements, and the plurality of testing inertial measurement data comprise a plurality of different data ranges; and
         training the inertial measurement data mapping model according to the plurality of testing inertial measurement data, so that the inertial measurement data mapping model maps the plurality of testing inertial measurement data to a testing movement vector with same value.

2. The electronic device of claim 1, wherein the inertial measurement data mapping model is configured to generate the first movement vector according to a normalized inertial measurement data of the first inertial measurement data after normalization process.

3. The electronic device of claim 1, wherein the processor is further configured to perform the following operations:
converting the first inertial measurement data into the first movement vector in the mixed reality environment coordinate system by the inertial measurement data mapping model when the electronic device moves to a first position in the real space, obtaining the first spatial operation point in the mixed reality environment coordinate system according to adding the starting coordinate point and the first movement vector, so as to execute the 3D scene editing program based on the first spatial operation point instantly or afterwards, wherein the 3D scene editing program comprises one of an event program, a special effects action program and a virtual object rendering program, and storing the 3D scene editing program corresponding to the first spatial operation point.

4. The electronic device of claim 3, wherein the inertial measurement element is further configured to obtain a second inertial measurement data when the electronic device moves, and the processor is further configured to operate the following operations:
converting the second inertial measurement data into a second movement vector in the mixed reality environment coordinate system by the inertial measurement data mapping model when the electronic device moves from the first position to a second position in the real space, obtaining a second spatial operation point in the mixed reality environment coordinate system according to adding the first spatial operation point and the second movement vector, so as to execute the 3D scene editing program based on the second spatial operation point instantly or afterwards, and storing the 3D scene editing program corresponding to the second spatial operation point.

5. The electronic device of claim 4, wherein the electronic device further comprises:
an output device, electrically coupled to the processor, configured to output one of the event program, the special effects action program and the virtual object rendering program at the output device when the processor is executing the 3D scene editing program; and
an input device, electrically coupled to the processor and a memory, and is configured to receive and transmit a selection signal to the processor after the processor executes the 3D scene editing program.

6. The electronic device of claim 5, wherein the event program, the special effects action program and the virtual object rendering program comprised in the 3D scene editing program comprise a plurality of event programs, a plurality of special effects action programs, and a plurality of virtual object rendering programs, wherein the output device comprises:
a screen device, wherein the screen device displays an edit list, and content of the edit list is selected from part of the plurality of event programs, the plurality of special effects action programs and the plurality of virtual object rendering programs.

7. The electronic device of claim 4, wherein the processor is further configured to operate the following operations:
executing the 3D scene editing program, and storing the 3D scene editing program together when storing two of the starting coordinate point, the first spatial operation point and the second spatial operation point.

8. The electronic device of claim 1, wherein the processor is further configured to operate the following operations:
extracting a feature anchor from an image captured by a camera device; and
establishing the mixed reality environment coordinate system in correspondence according to the feature anchor of the real space being a coordinate system origin of the mixed reality environment coordinate system.

9. The electronic device of claim 1, wherein the first movement vector comprises at least a movement distance and a rotation angle, wherein the first movement vector comprises a 6DoF movement trajectory of the first spatial operation point corresponding to the starting coordinate point.

10. A mixed reality production method, suitable for an electronic device, wherein the mixed reality production method comprises:
establishing a mixed reality environment coordinate system in correspondence according to a feature anchor of a real space, and calculating a starting coordinate point of the electronic device in the mixed reality environment coordinate system;
obtaining a first inertial measurement data when the electronic device moves;
converting the first inertial measurement data into a first movement vector in the mixed reality environment coordinate system according to an inertial measurement data mapping model;
calculating a first spatial operation point in the mixed reality environment coordinate system according to the starting coordinate point and the first movement vector in the mixed reality environment coordinate system; and
executing a 3D scene editing program with the first spatial operation point,
wherein a training of the inertial measurement data mapping model comprises:
collecting a plurality of testing inertial measurement data of a plurality of different testing electronic devices moving along a same testing route respectively, wherein the plurality of testing inertial measurement data are generated by a plurality of different inertial measurement elements, and the plurality of testing inertial measurement data comprise a plurality of different data ranges; and
training the inertial measurement data mapping model according to the plurality of testing inertial measurement data, so that the inertial measurement data mapping model maps the plurality of testing inertial measurement data to a testing movement vector with same value.

11. The mixed reality production method of claim 10, further comprising:
generating the first movement vector according to a normalized inertial measurement data of the first inertial measurement data after normalization process based on the inertial measurement data mapping model.

12. The mixed reality production method of claim 10, further comprising:
converting the first inertial measurement data into the first movement vector in the mixed reality environment coordinate system by the inertial measurement data mapping model when the electronic device moves to a first position in the real space;

obtaining the first spatial operation point in the mixed reality environment coordinate system according to adding the starting coordinate point and the first movement vector; and executing the 3D scene editing program based on the first spatial operation point instantly or afterwards, wherein the 3D scene editing program comprises one of an event program, a special effects action program and a virtual object rendering program, and storing the 3D scene editing program corresponding to the first spatial operation point.

13. The mixed reality production method of claim 12, further comprising:

converting second inertial measurement data into a second movement vector in the mixed reality environment coordinate system by the inertial measurement data mapping model when the electronic device moves from the first position to a second position in the real space;

obtaining a second spatial operation point in the mixed reality environment coordinate system according to adding the first spatial operation point and the second movement vector; and executing the 3D scene editing program with the second spatial operation point instantly or afterwards, and storing the 3D scene editing program corresponding to the second spatial operation point.

14. The mixed reality production method of claim 13, further comprising:

output one of the event program, the special effects action program and the virtual object rendering program at an output device when executing the 3D scene editing program; and receiving and transmitting a selection signal by an input device after executing the 3D scene editing program.

15. The mixed reality production method of claim 14, wherein the event program, the special effects action program and the virtual object rendering program comprised in the 3D scene editing program comprise a plurality of event programs, a plurality of special effects action programs, and a plurality of virtual object rendering programs, wherein the mixed reality production method further comprises:

displaying an edit list by a screen device of the output device, wherein content of the edit list is selected from part of the plurality of event programs, the plurality of special effects action programs and the plurality of virtual object rendering programs.

16. The mixed reality production method of claim 13, further comprising:

executing the 3D scene editing program, and storing the 3D scene editing program together when storing two of the starting coordinate point, the first spatial operation point and the second spatial operation point.

17. The mixed reality production method of claim 10, further comprising:

extracting a feature anchor from an image captured by a camera device; and establishing the mixed reality environment coordinate system in correspondence according to the feature anchor of the real space being a coordinate system origin of the mixed reality environment coordinate system.

18. The mixed reality production method of claim 10, wherein the first movement vector comprises a movement distance and a rotation angle, wherein the first movement vector comprises a 6DoF movement trajectory of the first spatial operation point corresponding to the starting coordinate point.

* * * * *